United States Patent [19]

Findlay et al.

[11] 4,383,824
[45] May 17, 1983

[54] AIR-HEATING GAS BURNER

[75] Inventors: James W. Findlay, Droitwich; John Darby, Wollescote; David Lewis, West Heath; Donald F. Wenn, Cleeve Prior, England

[73] Assignee: Nu-Way Energy Limited, Droitwich, England

[21] Appl. No.: 212,740

[22] Filed: Dec. 3, 1980

[30] Foreign Application Priority Data

Dec. 5, 1979 [GB] United Kingdom ............... 7941933

[51] Int. Cl.³ ............................................. F24H 1/00
[52] U.S. Cl. ............................... 432/222; 126/110 C; 239/426; 431/353
[58] Field of Search .............. 431/350, 353; 432/219, 432/222; 239/416.5, 426; 126/110 C

[56] References Cited

U.S. PATENT DOCUMENTS

| 1,340,902 | 5/1920 | Lundgaard | 431/350 |
| 3,154,134 | 10/1964 | Bloom | 239/416.5 |
| 3,156,454 | 11/1964 | Flynn | 431/90 X |
| 4,077,761 | 3/1978 | Dollinger et al. | 431/353 X |
| 4,244,349 | 1/1981 | Velie et al. | 126/110 C |

FOREIGN PATENT DOCUMENTS

| 1232372 | 10/1960 | France . |
| 2397603 | 2/1979 | France . |
| 1243626 | 8/1971 | United Kingdom . |

Primary Examiner—Edward G. Favors
Attorney, Agent, or Firm—Holman & Stern

[57] ABSTRACT

An air-heating gas burner has a housing which includes a fuel gas supply passage and an air supply passage which open into a combustion zone defined between walls which extend downstream of outlets for the gas and air. Combustion products emerging from said combustion zone are confined between further walls which extend downstream to a location at which the combustion process is substantially complete. The burner is intended for mounting in an air conduit and the combustion products emerging from between the further walls have a particularly low content of oxides of nitrogen.

14 Claims, 11 Drawing Figures

FIG. I.

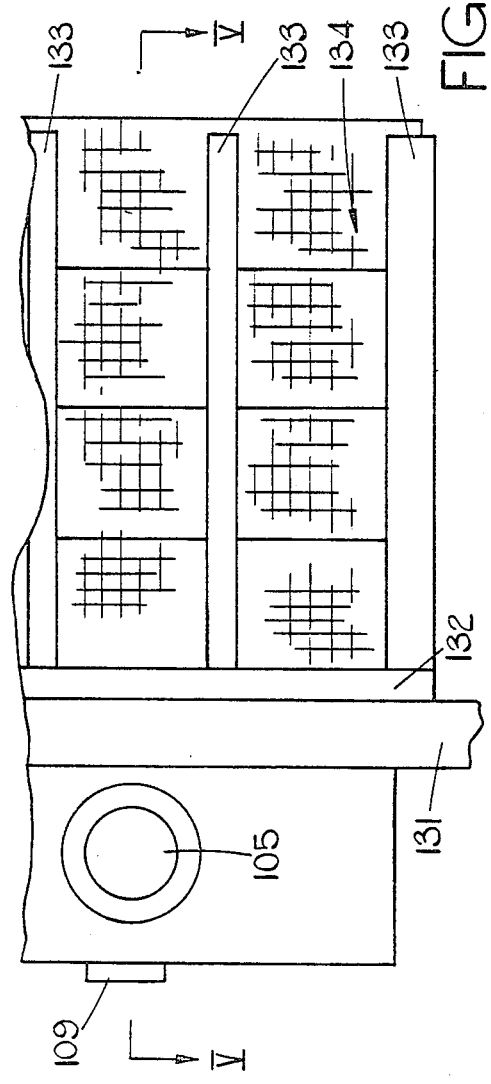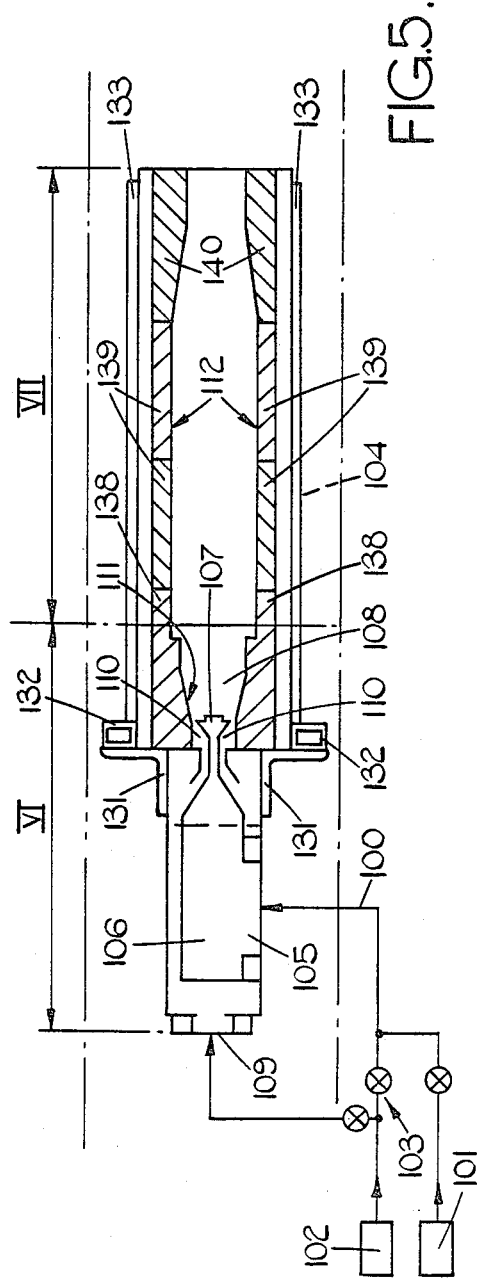

AIR-HEATING GAS BURNER

FIELD OF THE INVENTION

This invention relates to air-heating gas burners, and in particular to such burners in which the heated products of combustion are discharged into an air stream to heat the latter.

DESCRIPTION OF THE PRIOR ART

It is known to mount air heating burner arrangements within an airstream which flows pass them, the heated products of combustion from the burners mingling with the air-stream and heating the latter to a desired temperature. A disadvantage of such arrangements is that where the heated airstream is to be used in a manufacturing process, the products of combustion may contaminate the material to which the heated airstream is applied. In a particular case the products of combustion of a gas burner contain substantial amounts of oxides of nitrogen, principally nitrous oxide, though nitrogen dioxide may also be present. Though the acceptable levels of oxides of nitrogen vary from process to process, it is desirable, particularly in the processing of foodstuffs that these levels shall be as low as is reasonably possible. It is an object of the present invention to provide a burner, in which the products of combustion can be made to contain a reduced level of oxides of nitrogen.

BRIEF SUMMARY OF THE INVENTION

According to the invention a gas burner comprises a housing, an air supply passage within said housing, a gas supply passage within said air supply passage, said gas supply passage extending externally of said housing to define in conjunction therewith, an air outlet for said air supply passage, said gas supply passage having, adjacent an end thereof downstream of said air outlet, a gas outlet for directing a gas stream transversely of the direction of flow of an airstream emerging from said air outlet, first walls for confining and directing said airstream past said gas outlet, said first walls extending from adjacent said air outlet to a location downstream of said gas outlet, and second walls for confining the products of combustion emerging from the downstream end of a combustion zone defined between said first walls.

In a preferred embodiment said second walls extend downstream to a location at which the combustion process will be substantially complete.

In a further preferred embodiment said gas supply passage includes an outwardly projecting baffle device, upstream of said gas outlet, for creating turbulence in said airstream adjacent said gas outlet.

In yet another preferred embodiment the effective cross-sectional area of said combustion zone is between 1 and 1.8 times the effective flow area of said air outlet.

In a particular embodiment said combustion zone area is 1.4 times said air outlet area.

In a further embodiment said housing has a substantially plane face directed axially of said gas supply passage adjacent the gas outlet thereof, said air outlet being defined by a zone between said baffle device and the projection of the outer edge of said baffle device on to the plane of said housing face.

In another particular embodiment said gas outlet comprises a plurality of circular holes at a substantially equal distances from the plane of said housing face.

BRIEF DESCRIPTION OF THE DRAWING

Embodiments of the invention will now be described by way of example only and with reference to the accompanying drawings in which:

FIG. 4 is a partial diagrammatic view of the outside of part of an alternative form of burner, FIG. 5 is a diagrammatic cross-sectional view taken on line V in FIG. 4, and indicates the location of the burner in a surrounding air conduit.

DETAILED DESCRIPTION

Figure 1:
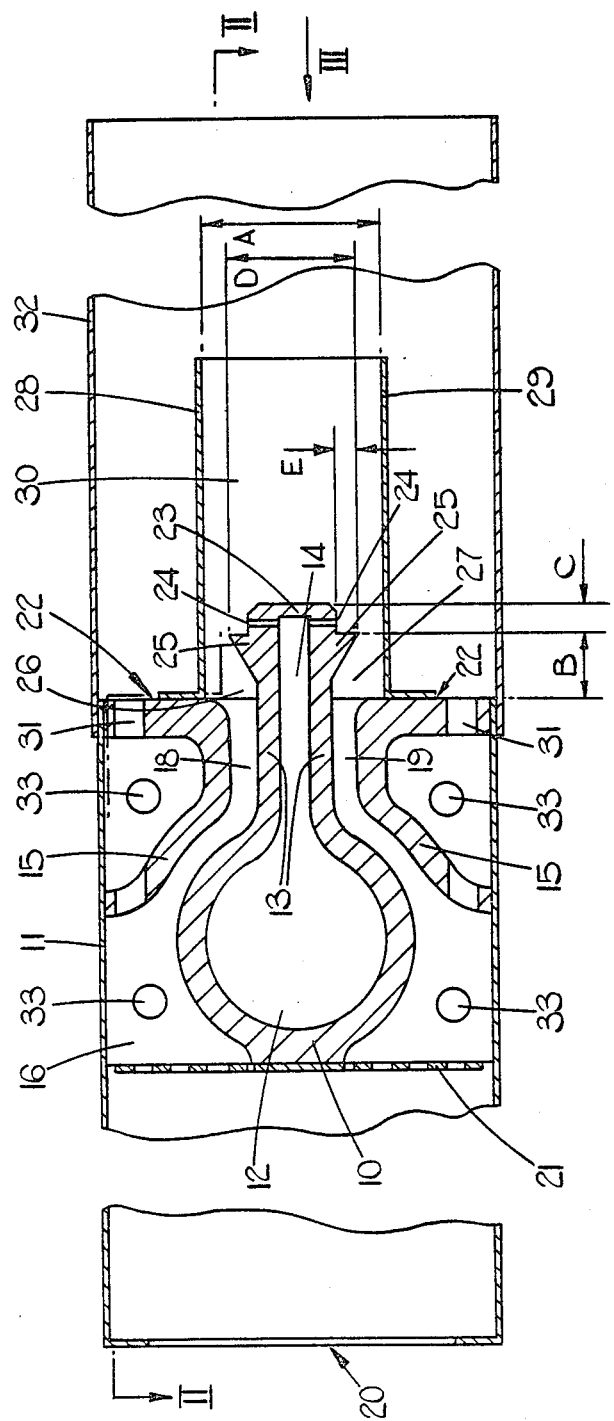
FIG. 1 is a cross-sectional view through a burner according to the invention.
Figure 2:
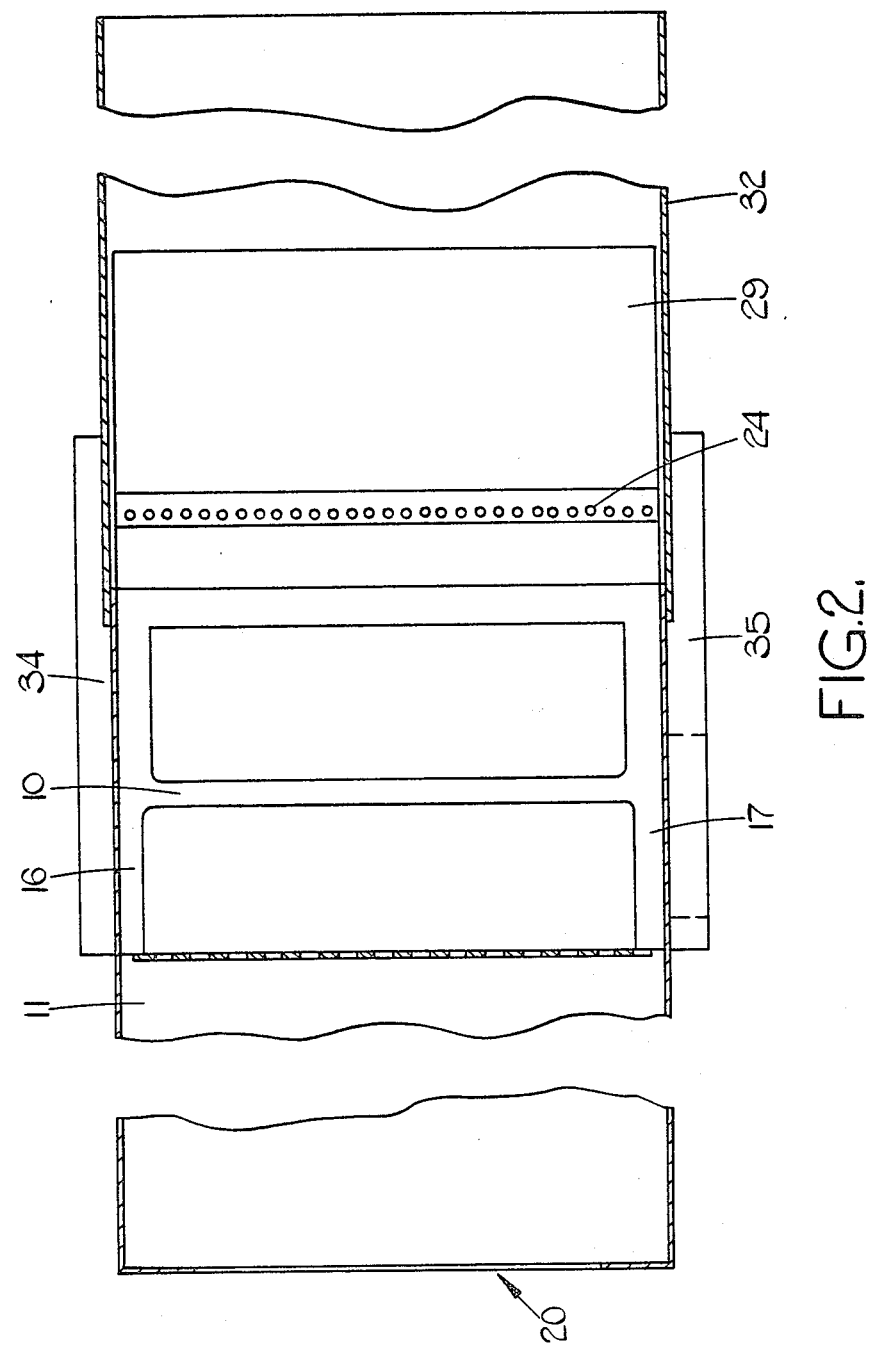
FIG. 2 is a cross-sectional view on line II—II in FIG. 1.
Figure 3:
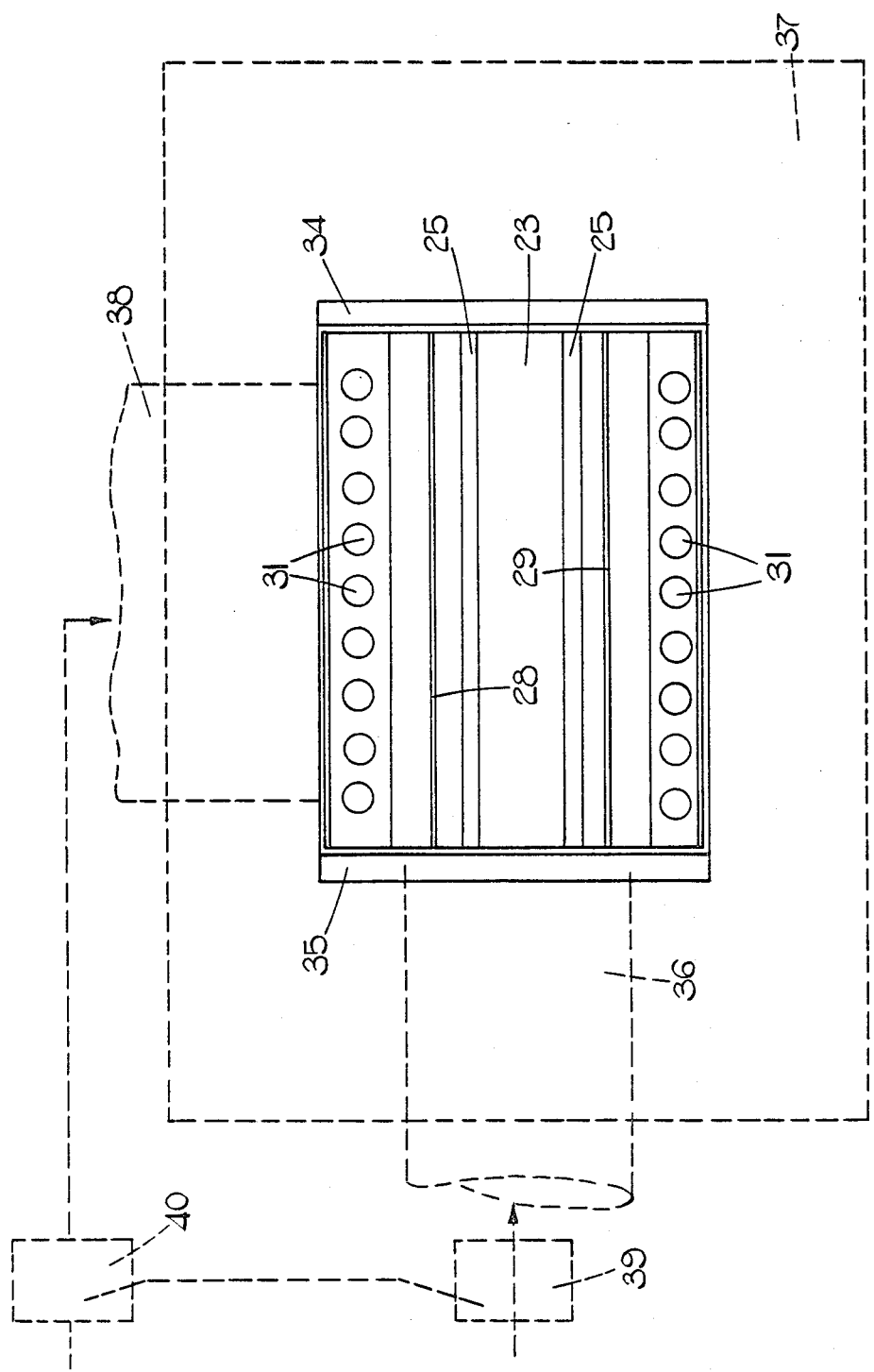
FIG. 3 is an end view taken in the direction of arrow III in FIG. 1 and also indicates the burner location in a surrounding air conduit.

The burner shown in FIGS. 1 to 3 comprises a housing made up of a casting 10 and a box section 11 of sheet metal. As shown more clearly in FIGS. 2 and 3 the casting 10 is generally rectangular in plan and end elevation. The casting 10 includes a generally cylindrical gas inlet passage 12 and a part 13 which defines a gas supply passage 14 which is of rectangular cross-section and which communicates with the inlet passage 12. The casting 10 also includes further part 15 which partly surrounds the portion 13 and co-operates therewith to define an air supply passage. The casting 10 has end walls 16, 17 which maintain the parts 13, 15 in their relative positions. Since the parts 13, 15 extend between the walls 16, 17 the air supply passage is effectively in two portions 18, 19 each of rectangular section. The air supply passage 18, 19 communicates with the inside of the box section 11. The box section 11, has at an end thereof remote from the casting 10, a combustion air inlet 20. A perforated diffuser plate 21 is fixed to the upstream side of the casting 10 to provide a balanced volumetric flow to the air supply passage 18, 19. The casting parts 15 have plane faces 22 which are directed downstream and are perpendicular to the flow axes of the gas supply passage 14 and air supply passage 18, 19. The faces 22 are radiused at their junction with the air supply passage portions 18, 19.

The gas supply passage 14 has an end wall 23 at its downstream end, and adjacent the end wall 23 and on opposite sides of the casting part 13 are two rows of gas outlet ports 24. The outer ends of the ports 24 lie, as shown in FIG. 1, further from the axis of the gas supply passage 14 than do the inner sides of the air passages 18, 19. Integral with the casting part 13 and on respective sides thereof adjacent the ports 24 are baffle parts 25 having relatively sharp outer edges and downstream faces which are perpendicular to the axis of the gas supply passage 14. The baffle parts 25 and the adjacent casting parts 15 cooperate to define primary combustion air outlets 26, 27 for the respective passages 18, 19.

Extending perpendicularly forward, that is in a downstream direction, of the faces 22 are two wall plates 28, 29 which confine and direct air issuing from the outlets 26, 27 and also define a primary combustion zone 30 downstream of the gas outlet ports 24. The flow area A between the plates 28, 29 is between 1.2 and 2.4 times the projected area D, in a plane normal to the axis of passage 14, between the outer edges of the baffle parts 25. Preferably the value of A/D is 2. The total flow area (A-D) is such as to enable combustion within the zone 30 to release heat at a rate of 286,000 Kilojoules/sq.cm.

The casting parts 15 may be provided with through holes 31 through which secondary combustion air can flow from the air inlet 20 to join the gases leaving the zone 30. A further metal box section 32 is substantially contiguous with the box section 11 and surrounds the zone 30. The box section 32 extends downstream of the zone 30 to confine the gases emerging therefrom and to isolate these gases from a surrounding air flow until combustion is substantially complete. The box section 32 may, in fact, extend to any desired length, subject to limitations imposed by apparatus in which the burner is mounted. As a practical consideration, however, the box section 32 will normally extend only sufficiently to ensure that the products of combustion leaving this section contain an acceptably low level of oxides of nitrogen.

As indicated in FIG. 1 the end walls 16, 17 of the casting 10 are provided with holes 33 so that a plurality of the castings may be secured together. The gas inlet passages 12 extend through the end walls 16, 17 and thus intercommunicate when a plurality of castings are joined together. In the present example, however, end plates 34, 35 are secured to the casting 10, the plate 34 blanking off the casting, and the plate 35 being adapted for connection to a gas supply line, indicated at 36 in FIG. 3.

As indicated in FIG. 3 the burner is disposed within an air conduit 37 so that the downstream end of the burner, from which the products of combustion emerge is directed downstream of air flow through the conduit 37. The burner is located within the conduit 37 by suitable means, which may in fact be the gas supply line 36 and an air supply trunking 38 which communicates with the combustion air inlet port 20. In alternative arrangements, however, the combustion air may be obtained from that supplied to the conduit 37.

As indicated above the length of the box section 32 is such as to provide an acceptable reduction in the oxides of nitrogen in the combustion products, before these are admitted to the surrounding air conduit. The length of the plates 28, 29 which define the zone 30 are such as to contain fully a recirculation zone of gas and air immediately downstream of the end wall 23 of the gas supply passage 14. The box section 32 and wall plates 28, 29 are preferably of materials which will provide a catalytic action on the gases enclosed thereby and in a preferred embodiment are made of stainless steel of a suitable grade.

The cross-sectional area A of the zone 30 is between 1.5 and 5 times the flow areas of the air supply passages 18, 19 taken together. In a preferred embodiment the area A is 3.3 times the total flow areas of the air supply passages 18, 19.

The cross-sectional area B of each of the primary combustion air outlets 26, 27 is for the purposes of the present invention defined as the zone between the outer edge of each of the baffle parts 25 and the projection of that edge upon the plane of the adjacent face 22 of the casting 10. The axial dimension of each area B is between 15 and 20 mm, a preferred dimension being 17.5 mm. Preferably the area A is between 1 and 1.8 times the sum of the areas B of the outlets 26, 27. In a preferred embodiment the area A is 1.4 times the sum of the areas B.

The pitch of the centers of the gas outlet ports 24 is between 3 and 5 times the diameter of these ports, and in a preferred embodiment is 4 times the diameter of the ports 24.

The dimension E between the outer edge of each projecting baffle part 25 and a surface onto which the gas outlet ports 24 open, is between 5 and 8 mm, and in a preferred embodiment is 6.5 mm. A dimension C between the downstream face of each baffle part 25 and the downstream face of the end wall 23 is between 8 and 12 mm, and in a preferred embodiment is 10 mm. IT is to be noted that the outer edges of the end wall 23 are bevelled, as shown in FIG. 1.

Supply of fuel gas and combustion air to the burner may be controlled by two linked valves 39, 40, as indicated in FIG. 3. It will be understood that where air from the conduit 37 is used for combustion, the valve 40 may be associated directly with the combustion air inlet 20.

In alternative embodiments there may be provided means, not shown, for recirculating to the zone 30 a part of the gases downstream of the zone 30, within the section 32, these recirculating gases including, of course, secondary combustion air.

In further alternative embodiments the inlet passage 12 may be supplied with a mixtue of gas and air, and references to the gas inlet passage 12, a gas supply passage 14 and gas outlet ports 24 are to be taken as including these elements when directing a gas and air mixture, a fuel gas always being present in the flows through the elements.

The burner shown in FIGS. 4 to 11 is, as shown in FIG. 5, intended to operate on a gas/air mixture which is supplied through a pipe 100 and is derived from a gas pressure source 101 and an air pressure source 102. Air from the source 102 is also supplied separately to the burner to provide secondary combustion air, in a manner to be described. Suitable valves 103 control the gas/air ratio, and the total quantities of gas and air supplied to the burner. The burner is, as indicated in FIG. 5, mounted in an air conduit 104 so that the downstream end of the burner, from which the products of combustion emerge is directed downstream of air flow through the conduit 104.

The gas/air mixture supplied through the pipe 101 passes through a gas inlet 105 to a gas supply chamber 106 and thence to a nozzle 107 which extends into a combustion zone 108 of the burner. Secondary combustion air from the source 102 is supplied to an air inlet 109 and can pass around the air supply chamber 106 to an air outlet 110 on either side of the nozzle 107.

The air stream from the outlet 110 is confined and directed past the nozzle 107 by first walls 111, and the products of combustion emerging from the zone 108 between the first walls 111 is confined by further walls 112 which extend in a downstream direction from the nozzle 108 for a distance defined hereinafter.

Figure 6:
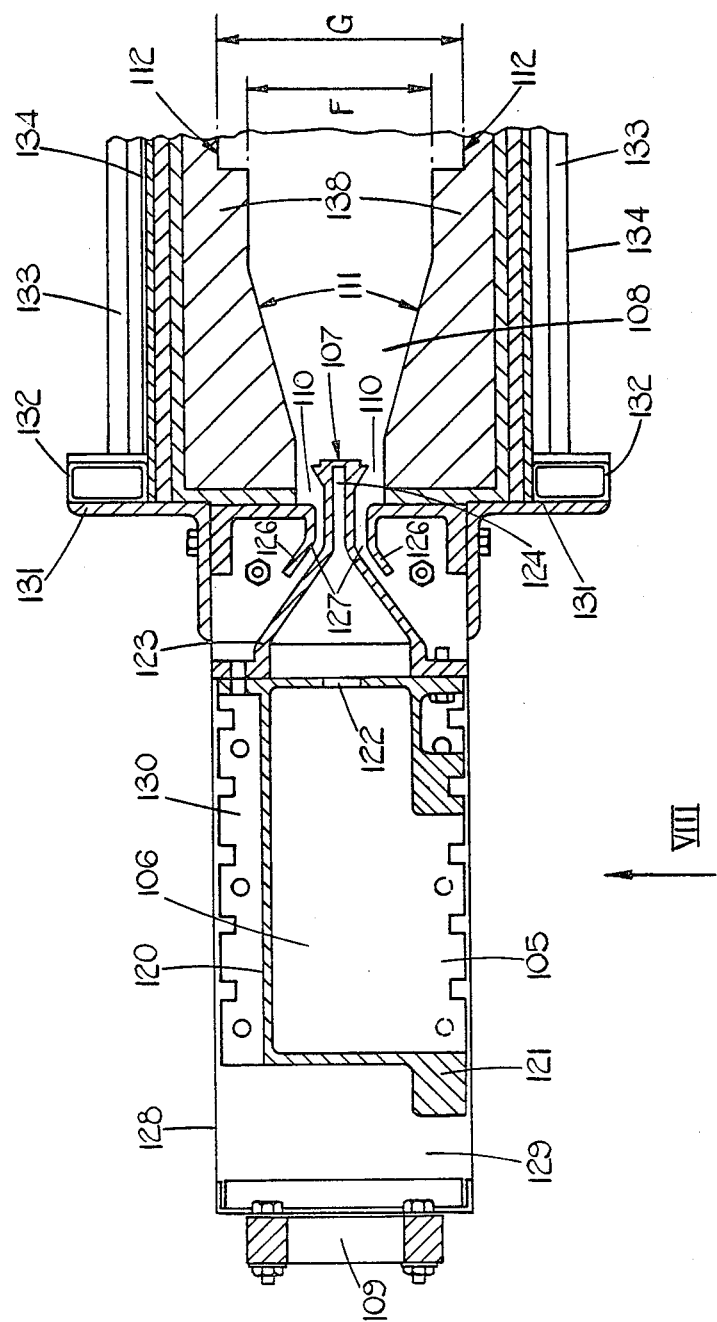
FIG. 6 is a cross-sectional view, on a larger scale, of the portion of FIG. 5 indicated at VI.
Figure 7:
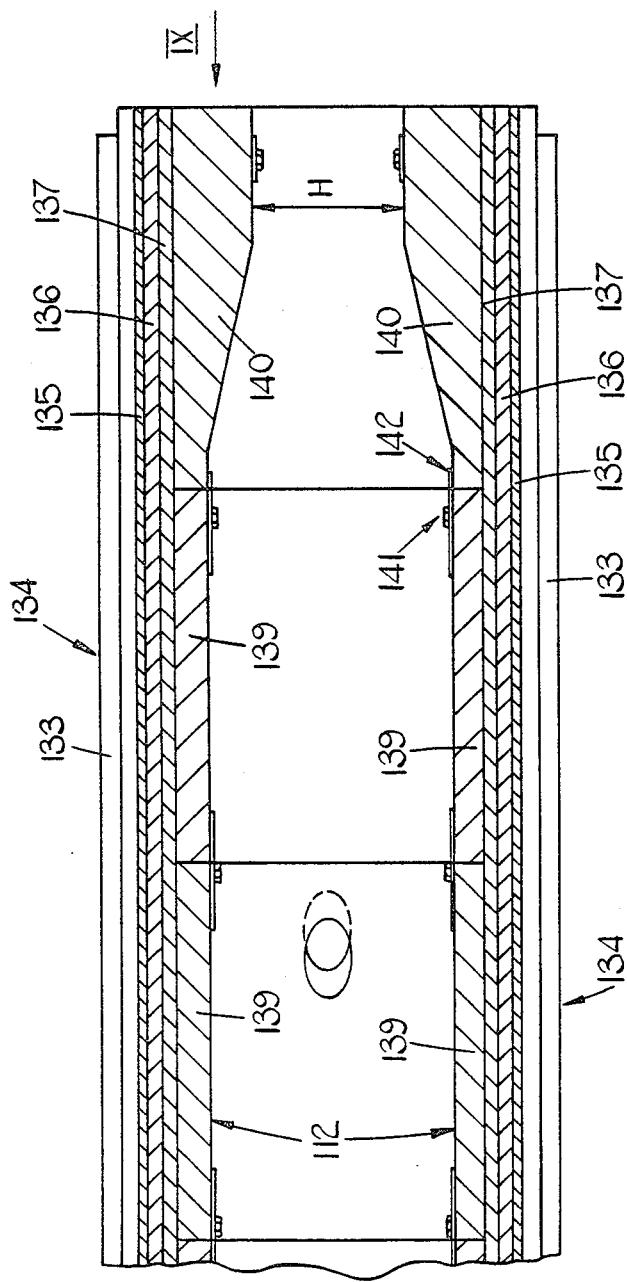
FIG. 7 is a cross-sectional view, on a larger scale, of the portion of FIG. 5 indicated at VII.
Figure 8:
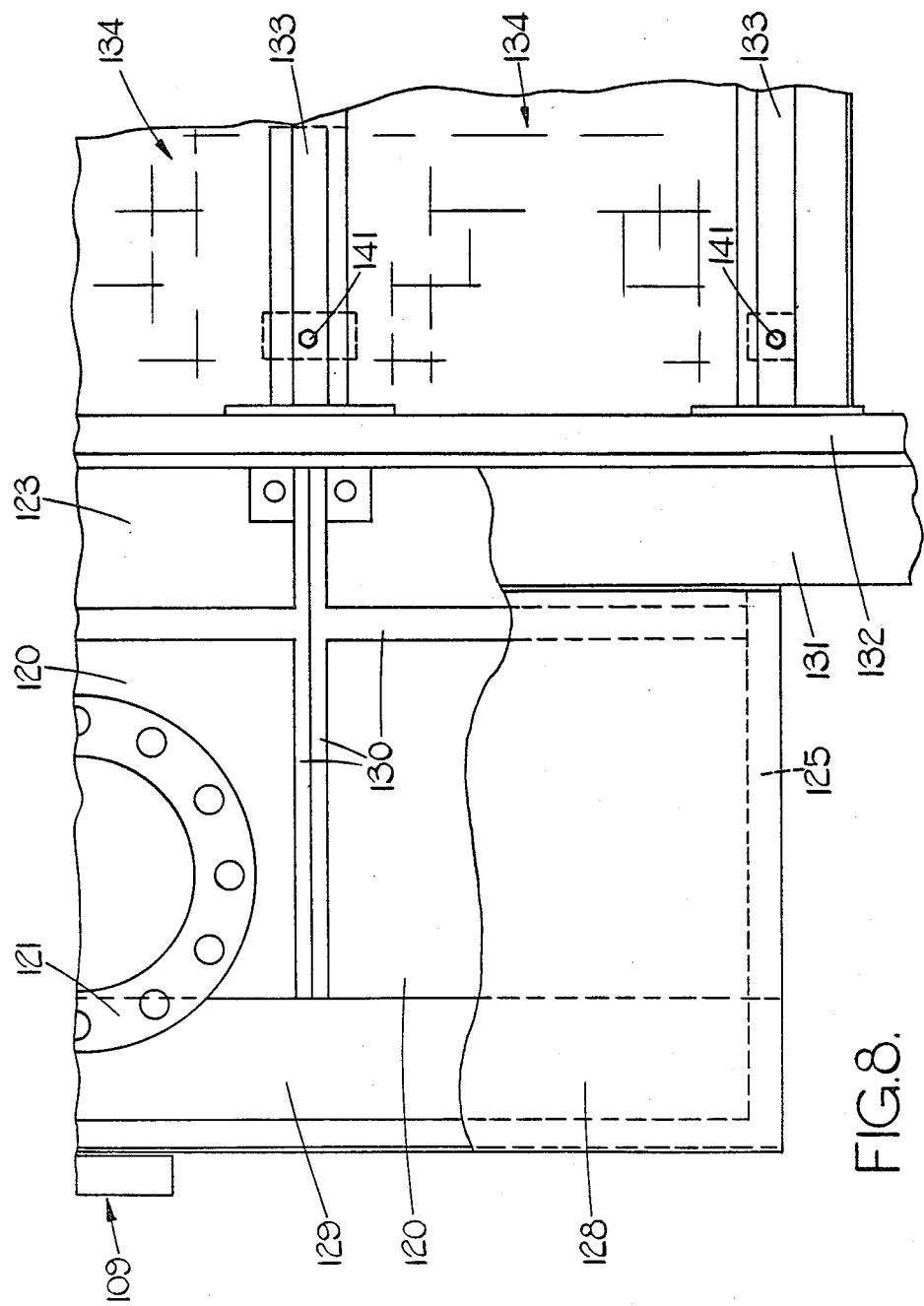
FIG. 8 shows one half of a portion of the burner, as viewed in the direction of arrow VIII in FIG. 6.
Figure 9:
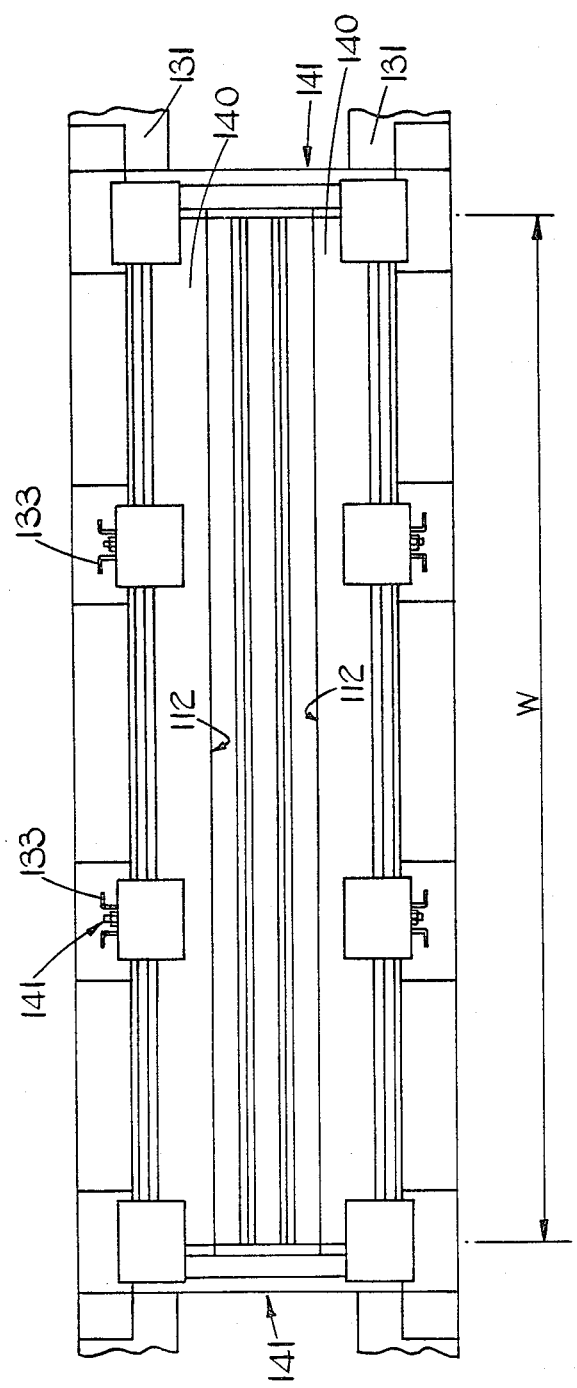
FIG. 9 is a view, on a reduced scale, taken in the direction of arrow IX in FIG. 7.

The construction of the burner indicated in FIGS. 4 and 5 is shown in more detail in FIGS. 6 to 11. As shown in FIGS. 6 and 8 the gas supply chamber 106 comprises a plurality of box-section castings 120 which are secured end-to-end to provide that the gas supply chamber 106 extends across the whole width of the burner. In the present example the chamber 106 comprises three castings 120 in end-to-end relationship, the center one of the castings 120 having a flanged inlet port 121 which provides the gas inlet 105. The downstream end of each of the castings 120 is provided with ports 122 through which the gas/air mixture can flow to the insides of further castings 123 which are secured to the castings 120 which provide the nozzles 107 and which include gas supply passages 124 through which the gas/air mixture can pass to the combustion zone 108. The castings 123 are of rectangular section in planes transverse to the gas flow therethrough and are, as indicated in FIG. 8 joined in end-to-end relationship so as to provide a gas supply passage 124 which extends substantially from side-to-side of the burner. End plates 125, only one of which is indicated in FIG. 8, are secured to the castings 120, 123 to close the ends of the gas supply chamber 106.

The castings 123 include portions 126 which define air supply passages 127 of rectangular section on either side of the nozzle 107. A sheet metal box 128 surrounds the castings 120, 123 to define an air supply chamber 129 through which secondary combustion air can flow from the air inlet 109 to the air supply passages 127, the supply chamber 129 extending from side-to-side of the burner. Connecting flanges 130 on the castings 120, 123 are provided with cut-outs as indicated in FIG. 6, to permit free distribution of air through the chamber 129.

Secured to the castings 123 are angle sections 131 which extend transversely of the burner and project beyond the remainder of the burner by distances sufficient to enable the burner to be mounted in a surrounding air conduit 104 secured to the respective angle sections 131 are box-section extrusions 132 to each of which a plurality of spaced parallel support members 133 is secured in cantilever fashion. The support members 133 extend lengthwise of the burner to adjacent the downstream end thereof. Secured between the members 133, across the width of the burner, are wire mesh sheets, indicated at 134, in FIGS. 4, 7 and 8. Also secured to the support members 133, inwardly of the mesh sheets 134 are a plurality of insulating layers whose inner surfaces provide the walls 111, 112 indicated in FIGS. 5, 6, 7 and 9. The outer of the insulating layers comprises a 6 mm thick insulating fibre blanket 135. The next inner layer comprises a 10 mm thick rigid ceramic fibre board 136. The next inner layer comprises a 10 mm thick ceramic fibre blanket 137 and the inner most layer is provided by vacuum molded ceramic fibre blocks or tiles 138, 139, 140. The blankets 135, 137, boards 136 and tiles 138, 139, 140 are of types obtainable from McKechnie Refractory Fibres Limited of Cheshire, England. The blankets, boards and tiles are secured to the members 133 by studs 141 and washer plates 142.

The side walls 143 (FIG. 9) of the combustion zone 108 and the zone downstream thereof are similarly provided by ceramic fibre blankets, boards and tiles, the inner tiles being in this case of uniform thicknesses so that the width W of the flow area for the products of combustion is constant downstream of the nozzle 107.

Figure 10:
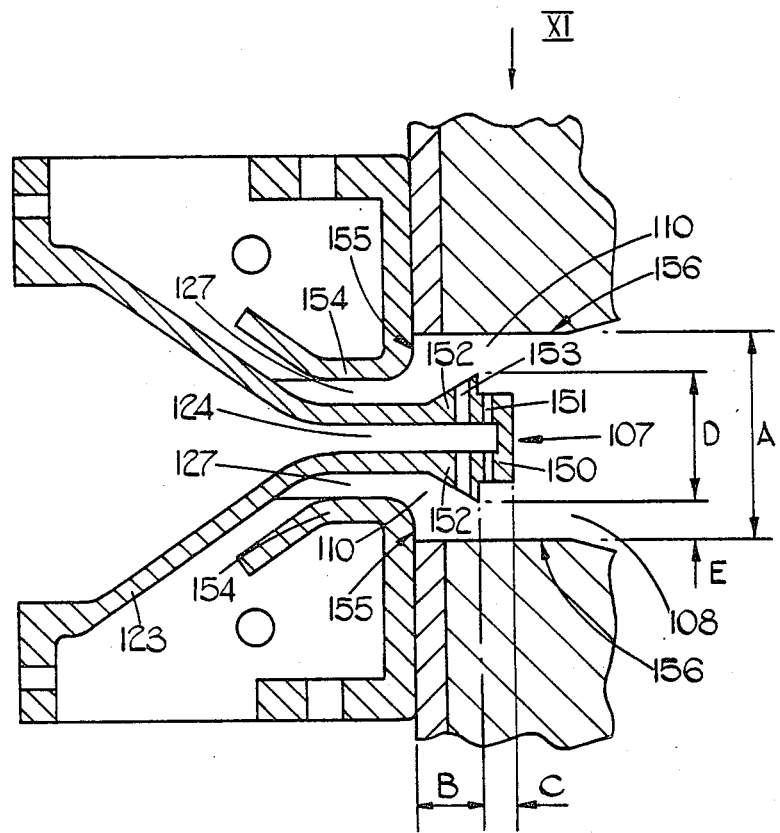
FIG. 10 is a cross-sectional view, on an enlarged scale, of the gas and air supply passages shown in FIG. 6.
Figure 11:
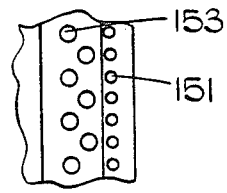
FIG. 11 is a view taken in the direction of arrow XI in FIG. 10 of the outlet end of the gas supply passage.

The nozzle 107 and its associates air supply passages 127 are shown in greater detail in FIG. 10. As previously indicated the castings 123 extend from side-to-side of the burner so that the gas supply passage 124, the air supply passages 127 and the air outlet 110 are of rectangular cross-section. The downstream end of the gas supply passage 124 is closed by an end wall 150, and adjacent the wall 150 and on opposite sides of the gas supply passage 124 are two rows of gas outlet ports 151. The outer ends of the ports 151 lie, as shown in FIG. 10, further from the axis of the gas supply passage 24 than do the inner sides of the air supply passages 127. Integral with the nozzle 107, and on opposite sides thereof adjacent the ports 151 are baffle parts 152 having relatively sharp outer edges and downstream faces which are perpendicular to the axis of the gas supply passage 124. Extending through the baffle parts 152 are further gas outlet ports 153 which are of larger diameter than the ports 151 and are arranged in two staggered rows, as shown in FIG. 11. The baffle parts 152 co-operate with adjacent parts 154 of the casting 123 to define the air outlets 110. The parts 154 have plane faces 155 which are directed downstream and are perpendicular to the flow axes of the gas supply passage 124 and the air supply passage 127. The faces 155 are radiused at their junction with the air supply passages 127. Extending perpendicularly of the faces 155 are portions 156 of the walls 111. The flow area A between the wall portions 156 is between 1.2 and 2.4 times the projected area D, in a plane normal to the axis of the passage 124, between the outer edges of the baffle parts 152. Preferably, the value A/D is 2. The total flow area (A-D) is such as to enable combustion within the zone 108 to release heat at a rate of 286,000 kilojoules/sq.cm. The area A is also between 1.5 and 5 times the flow areas of the air supply passages 127, taken together. In a preferred embodiment the area A is 3.3 times the total flow areas of the air supply passages 127.

The cross-sectional area B of each of the air outlets 110 is, for the purposes of the present invention, defined as the zone between the outer edge of each of the baffle parts 152 and the projection of that edge on the adjacent part 154 of the casting 123. The axial dimensions of each area B is between 15 and 20 mm, a preferred dimension being 17.5 mm. Preferably the area A is between 1 and 1.8 times the sum of the areas B. In a preferred embodiment the area A is 1.4 times the sum of the area B.

A dimension C between the downstream face of each baffle part 152 and the downstream face of the end wall 150 is between 8 and 12 mm, and in a preferred embodiment is 9 mm. A dimension E between the outer edge of each baffle part 152 and the surface onto which the gas outlet ports 151 open is between 4 and 8 mm, and in a preferred embodiment is 5.5 mm.

The outlet ports 151 are 3.1 mm in diameter and are equally spaced at pitches of 6.35 mm. The outlet ports 153 are 4.4 mm in diameter and each of the rows has a pitch of 12.7 mm.

The portion 156 of the wall 111 extends normally of the faces 155 for approximately 38 mm and the walls 111 thereafter diverge in a downstream direction with an included angle of 30° up to a point where the cross-sectional area F (FIG. 6) is 3.7 times the area D (FIG. 10). At a distance of 60 mm further downstream the tiles 138 are stepped to provide a cross-section area G between the walls 112 the area G being 4.2 times the area D. Adjacent the downstream end of the burner the tiles 140 provide portions of the wall 112 which converge with an included angle of 25° to provide a burner outlet whose cross-sectional area H is approximately 3 times the area D. The length of the burner in a direction downstream of the faces 155 of the casting 123 is, in the present example 975 mm, but may have other lengths consistent with the products of combustion leaving the burner containing an acceptably low level of oxides of nitrogen.

Though the burner described has a width resulting from the use of 3 each of the castings 120, 123 it will be appreciated that desired alternative widths are obtainable by the use of suitable numbers of these castings.

In use the burner of the present example is supplied, at its inlet 105 with a mixture of natural gas and air in the proportion of 1 volume of gas to 14 volumes of air, and with air at its inlet 109 in the proportion of 5 volumes of air to 1 volume of the natural gas in the mixture supplied to inlet 105. It has been found that in these proportions the temperature of the products of combustion does not exceed 1250° C., and this temperature limitation, combined with the improved mixing within the burner downstream of the nozzle 107 substantially reduces the amount of the oxides of nitrogen in the products of combustion leaving the downstream end of the burner.

We claim:

1. An air-heating gas burner comprising a housing and an air supply passage within said housing, a gas supply passage within said air supply passage, said gas supply passage extending externally of said housing to define in conjunction therewith an air outlet for said air supply passage, said gas supply passage having adjacent an end thereof downstream of said air outlet a gas outlet for directing a gas-stream transversely of the direction of flow of an air-stream emerging from said air outlet, first walls for confining and directing said air-stream past said gas outlet, said first walls extending from adjacent said air outlet to a location downstream of said fuel gas outlet and second walls for confining the products of combustion emerging from the downstream end of a combustion zone defined between the first walls, said gas supply passage including an outwardly projecting baffle device upstream of said gas outlet for creating turbulence in said air-stream adjacent said gas outlet, and a further gas outlet communicating with said gas supply passage and extending through said baffle device transversely of said gas supply passage.

2. An air-heating gas burner comprising a housing, an air supply passage within said housing, an air outlet at the downstream end of said air supply passage, a gas supply passage within said air supply passage, said gas supply passage having an outwardly projecting baffle device downstream of said air outlet and a gas outlet downstream of said baffle device, first walls having substantially plane faces directed axially downstream of said gas supply passage for confining and directing an air-stream from said air outlet past said gas outlet and defining a combustion zone, said air outlet being defined by a zone between said baffle device and said plane faces and second walls for confining the products of combustion emerging from said combustion zone, the effective cross-sectional area of said combustion zone being between 1 and 1.8 times the total flow area of said air outlet.

3. A gas burner as claimed in claim 2, wherein said second walls extend downstream to a location at which the combustion process is substantially complete.

4. A gas burner as claimed in claims 2 wherein said baffle device has a relatively sharp outer edge and a downstream face which is perpendicular to the flow axis of said gas supply passage.

5. A gas burner as claimed in claim 1 wherein the effective cross-sectional area of said combustion zone is between 1 and 1.8 times the total flow area of said air outlet.

6. A gas burner as claimed in claim 5 wherein said cross-sectional area of the combustion zone is 1.4 times said total flow area.

7. A gas burner as claimed in claim 1 wherein said first walls have substantially plane faces directed axially of said gas supply passage adjacent the gas outlet thereof, said air outlet being defined by a zone between said baffle device and the projection of the outer edge of said baffle device on to said plane faces.

8. A gas burner as claimed in claim 7 wherein the effective cross-sectional area of said combustion zone is between 1.2 and 2.4 times the area of said projection of the outer edge of said baffle device on to said faces.

9. A gas burner as claimed in claim 8 in which said area of the combustion zone is twice the area of said projection.

10. A gas burner as claimed in claim 7 wherein said gas outlet comprises a plurality of ports which lie in a single plane which is in spaced parallel relationship with respect to said plane faces.

11. A gas burner as claimed in claim 2 wherein the cross-sectional area of said combustion zone is between 1.5 and 5 times the flow area of said air supply passage.

12. A gas burner as claimed in claim 11 in which said combustion zone area is 3.3 times the flow area of the air supply passage.

13. A gas burner as claimed in claim 2 wherein said first and second walls are formed of refractory non-metallic material.

14. A gas burner as claimed in claim 13 in which said walls are formed of moulded ceramic fibre.

* * * * *